(12) United States Patent
Ignjatovic et al.

(10) Patent No.: US 9,232,521 B2
(45) Date of Patent: Jan. 5, 2016

(54) METHODS AND APPARATUS FOR IMPLEMENTING PRIVATE BRANCH EXCHANGE ACCESS TO AN IP MULTIMEDIA SUBSYSTEM

(71) Applicant: Telefonaktiebolaget L M Ericsson (publ), Stockholm (SE)

(72) Inventors: Dusan Ignjatovic, Stockholm (SE); Andreas Anulf, Lidingö (SE); Nils Hänström, Huddinge (SE); Kresimir Peharda, Düsseldorf (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 95 days.

(21) Appl. No.: 13/914,280

(22) Filed: Jun. 10, 2013

(65) Prior Publication Data
US 2013/0329705 A1  Dec. 12, 2013

Related U.S. Application Data

(60) Provisional application No. 61/657,988, filed on Jun. 11, 2012.

(51) Int. Cl.
*H04W 72/04* (2009.01)
*H04L 12/24* (2006.01)
*H04L 29/06* (2006.01)
*H04M 3/42* (2006.01)

(52) U.S. Cl.
CPC ....... *H04W 72/0446* (2013.01); *H04L 41/0803* (2013.01); *H04L 65/1053* (2013.01); *H04L 65/1016* (2013.01); *H04L 65/1063* (2013.01); *H04L 65/1066* (2013.01); *H04L 65/1069* (2013.01); *H04M 3/42314* (2013.01)

(58) Field of Classification Search
USPC ......... 370/352, 329, 389, 338, 321, 326, 356, 370/401, 336, 337
See application file for complete search history.

(56) References Cited

U.S. PATENT DOCUMENTS

| 8,068,469 B2* | 11/2011 | Chiu et al. ............... 370/338 |
| 2008/0032691 A1* | 2/2008 | Kyzivat ............... 455/435.1 |
| 2010/0069101 A1* | 3/2010 | Mahdi et al. ............... 455/466 |
| 2010/0111076 A1 | 5/2010 | Duffy et al. |
| 2011/0158236 A1* | 6/2011 | Siegel et al. ............... 370/392 |
| 2013/0212298 A1* | 8/2013 | Bunch et al. ............... 709/244 |

FOREIGN PATENT DOCUMENTS

| CN | 101212323 B | 8/2010 |
| EP | 2 299 648 A1 | 3/2011 |
| WO | WO 2009/082297 A1 | 7/2009 |

OTHER PUBLICATIONS

European Search Report, EP Application No. EP 13 17 1295, Apr. 24, 2015.

* cited by examiner

*Primary Examiner* — Habte Mered
*Assistant Examiner* — Rownak Islam
(74) *Attorney, Agent, or Firm* — Myers Bigel Sibley & Sajovec, P.A.

(57) ABSTRACT

A method of enabling configuration of a link between a circuit-switched Private Branch Exchange (CS PBX), and an access gateway node that connects at least one CS PBX to an IP Multimedia Subsystem (IMS). The method is performed at an IMS application server, AS. The AS is configured with timeslot configuration information for each link between the access gateway node and the at least one CS PBX. The AS receives, from the access gateway node, a request for timeslot configuration information for one or more of the links, and identifies the one or more links to which the request relates. The AS then retrieves the timeslot configuration information for the identified link, and sends a response indicating this information to the access gateway node.

16 Claims, 6 Drawing Sheets

METHODS AND APPARATUS FOR IMPLEMENTING PRIVATE BRANCH EXCHANGE ACCESS TO AN IP MULTIMEDIA SUBSYSTEM

CROSS REFERENCE TO RELATED APPLICATION

This application claims priority to and the benefit of U.S. Provisional Application No. 61/657,988 filed Jun. 11, 2012, the disclosure of which is hereby incorporated herein by reference in its entirety as if set forth fully herein.

TECHNICAL FIELD

This disclosure relates to methods and apparatus for implementing Private Branch Exchange (PBX) access to an IP Multimedia Subsystem (IMS). More particularly, the disclosure relates to methods and apparatus for configuring a link between a circuit switched PBX and an access gateway node that connects the CS PBX to the IMS.

BACKGROUND

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

Figure 1:
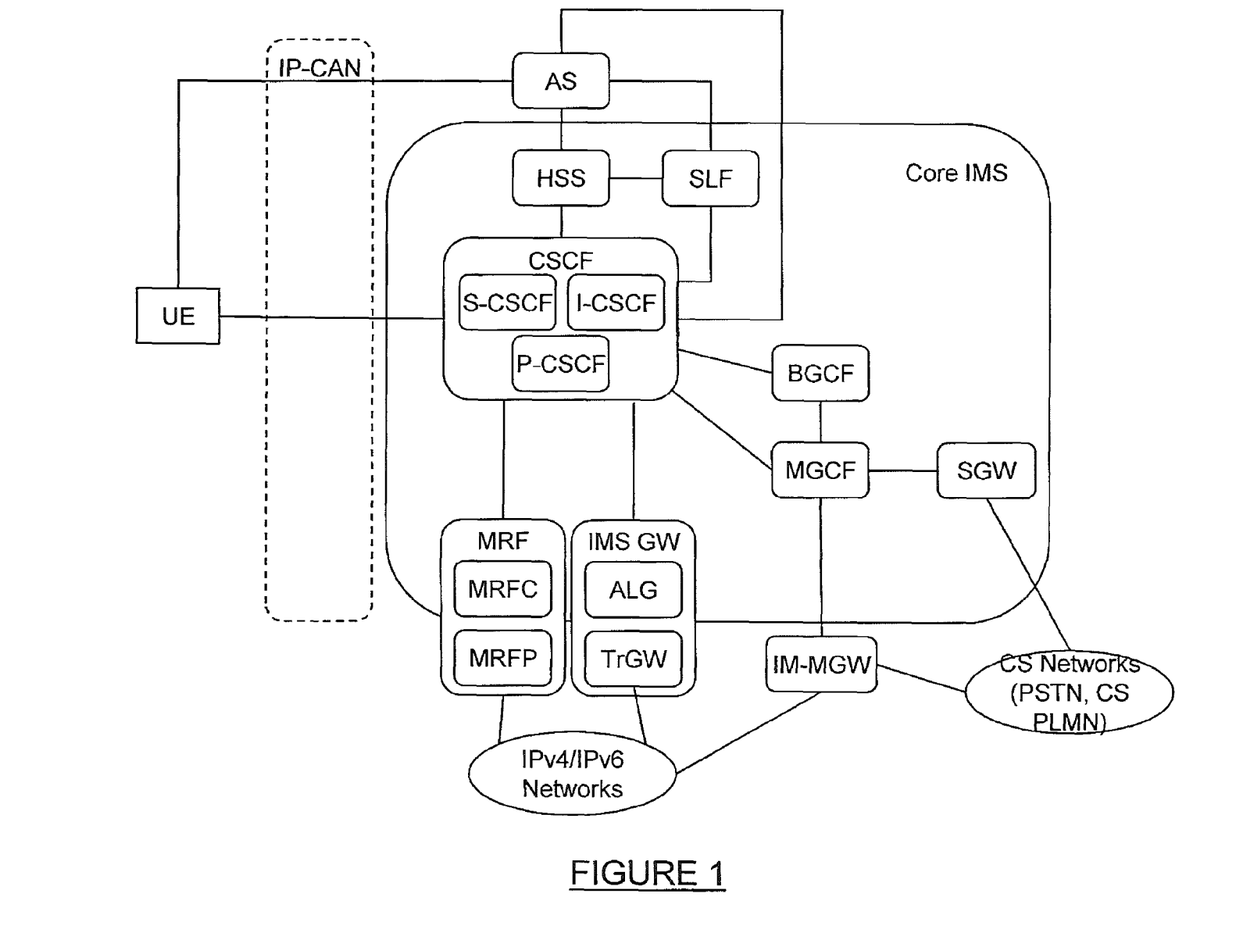
FIG. 1 illustrates schematically an overview of the 3GPP/TISPAN IMS architecture.

FIG. 1 illustrates schematically an overview of the 3GPP/TISPAN IMS architecture. Call/Session Control Functions (CSCFs) operate as SIP proxies within the IMS core network, and interface with other entities such as Border Gateway Control Functions (BGCFs) and Media Resource Function Controllers (MRFCs) amongst others. A Proxy CSCF (P-CSCF) is the first point of contact within the IMS for a SIP terminal; a Serving CSCF (S-CSCF) provides services to the subscriber; an Interrogating CSCF (I-CSCF) identifies the correct S-CSCF and forwards to that S-CSCF a request received from a SIP terminal via a P-CSCF.

Application Servers (ASs) are provided for implementing IMS service functionality. Application Servers provide services to end users in an IMS system, and may be connected either as end-points over the 3GPP defined Ma interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

The IMS architecture was originally designed to enable Public Land Mobile Network (PLMN) operators to offer their subscribers multimedia services based on and built upon Internet applications, services and protocols. As such, the architecture was optimized for supporting mobile users where each user was individually configured, represented and given resources in the network independently of each other. Support for fixed networks, such as public switched telephone network (PSTN), has therefore only subsequently been added to the IMS specification in an ad-hoc manner. In particular, IMS support for Private Branch Exchanges (PBX), which interconnect the internal telephones of a private organization and connects them to the PSTN via trunk lines, has only recently been given proper consideration by the ETSI TISPAN and the SIP FORUM organisations.

Figure 2:
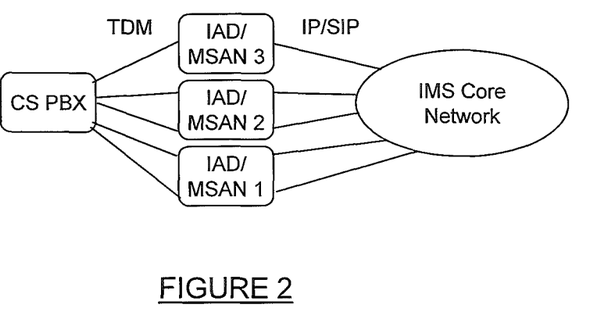
FIG. 2 illustrates schematically a CS PBX having multiple connections/links to an IMS core network via multiple gateway nodes.

In this regard, a PBX can support IP/SIP (i.e. an IP-PBX) and can therefore register directly with the IMS. Alternatively, a PBX can be a legacy circuit switched PBX (i.e. CS PBX) that supports E1/T1/BRI links, and that connects to the IMS by way of at least one access gateway node that interworks between Time-Division Multiplexing (TDM) circuit switching used on the E1/T1/BRI links and SIP. Such an access gateway node can be an Integrated Access Device (IAD) located at the customer premises or a Multi Service Access Node (MASN) located at an operator site such as a telephone exchange. For example, TISPAN defines a Customer Network Gateway (CNG) that provides IAD functionality for a NGCN/PBX. FIG. 2 illustrates schematically a CS PBX having multiple connections/links to an IMS core network via multiple IADs/MSANs. Whilst not illustrated in FIG. 2, it is also possible that a single CS PBX be connected to a single IAD/MSAN by multiple TDM links, and that multiple CS PBXs can be connected to a single IAD/MSAN.

The IAD/MSAN essentially acts as a translator, converting the SIP signalling into signals that the CS PBX can interpret, and assigning a timeslot on the link (or one of the links) to the CS PBX to those signals according to local rules. The IAD/MSAN interprets the wildcarded portion of the IMPU in SIP requests directed to the PBX in order to ensure that the call is directed to the proper PBX using the proper CS link. If the IMPU is in the format of an E.164 number, this may simply involve inserting the E.164 into the signalling on the CS channel.

Each TDM link contains multiple channels, each of which occupies a certain timeslot in the TDM scheme. For PRI (E1/T1) and BRI TDM links, it may be desirable for operators to be able to configure each link such that the timeslots on the link are divided into those that are to be used for incoming calls (i.e. incoming timeslots), those that are to be used for outgoing calls (i.e. outgoing timeslots), and/or those that are can be used for either incoming calls or outgoing calls (i.e. bidirectional timeslots). Therefore, in circumstances in which a CS PBX connects to the IMS via at least one IAD or MSAN, both the CS PBX and the IAD/MSAN must have the same link timeslot configuration for each TDM link between the CS PBX and the IAD/MSAN.

Currently, timeslot configuration for the TDM links between an IAD/MSAN and a CS PBS (i.e. IAD/MSAN ports) requires manual Operation and Maintenance (O&M) configuration of each IAD/MSAN. However, such manual configuration of each IAD/MSAN is inefficient and increases the operating costs of an IAD/MSAN. Whilst it would be possible to provide each IAD/MSAN with an additional interface that allows each IAD/MSAN to be remotely provisioned with the link timeslot configuration this is not desirable as it places additional burdens on the IAD/MSAN manufacturers.

SUMMARY

It is an aim of the present disclosure to provide methods and apparatus that enable timeslot configuration for the TDM links between an access gateway node and a CS PBX to be performed without the need for manual configuration of each access gateway node.

According to a first embodiment there is provided a method of enabling configuration of a link between a circuit-switched Private Branch Exchange (CS PBX), and an access gateway node that connects at least one CS PBX to an IP Multimedia Subsystem (IMS). The method is performed at an IMS application server, AS. The AS is configured with timeslot configuration information for each link between the access gateway node and the at least one CS PBX. The AS receives, from the access gateway node, a request for timeslot configuration information for one or more of the links, and identifies the one or more links to which the request relates. The AS then retrieves the timeslot configuration information for the identified link, and sends a response indicating this information to the access gateway node.

The step of receiving a request for timeslot configuration information may comprise receiving a SIP SUBSCRIBE message that includes a token within an Event header field, the token indicating that the subscription relates to a request for link timeslot configuration information.

The step of identifying the one or more links between the access gateway node and a CS PBX to which the request relates may comprise obtaining a IMS Public User Identity, IMPU, from the SIP SUBSCRIBE message, and matching the obtained IMPU to a stored IMPU that is associated with the one or more links.

The method may further comprise, for each link between the access gateway node and the at least one CS PBX, configuring the AS to store an IMPU in association with the link and/or a group comprising the link.

The step of identifying the one or more links between the access gateway node and a CS PBX to which the request relates may comprise obtaining a Contact address from the SIP SUBSCRIBE message, and matching the obtained contact address to a stored contact address that is associated with the one or more links. The method may then further comprise, prior to receiving the SIP SUSCRIBE message, receiving a SIP REGISTER message associated with the one or more links, and acquiring a contact address associated with the one or more links from the SIP REGISTER message, and storing the learned contact address of the one or more links.

The step of sending a response to the access gateway node may comprise generating a SIP NOTIFY message and including the timeslot configuration information for the identified one or more links in a body of the SIP NOTIFY message, and sending the SIP NOTIFY message to the access gateway node.

According to a second embodiment there is provided an IP Multimedia Subsystem (IMS) Application Server (AS) configured to enable configuration of one or more links between a circuit-switched Private Branch Exchange (CS PBX) and an access gateway node that connects at least one CS PBX to the IMS. The AS comprises a memory, a receiver, a processor, and a transmitter. The memory is configured to store timeslot configuration information for each link between the access gateway node and the at least one CS PBX. The receiver is configured to receive, from the access gateway node, a request for timeslot configuration information for one or more links between the access gateway node and a CS PBX. The processor is configured to identify the one or more links to which the request relates, to retrieve the timeslot configuration information for the identified one or more links, and to generate a response including the timeslot configuration of the identified one or more links. The transmitter is configured to send the response to the access gateway node.

The receiver may be configured to receive a SIP SUBSCRIBE message that includes a token within an Event header field, the token indicating that the subscription relates to a request for link timeslot configuration information. The processor may then be configured to obtain a IMS Public User Identity (IMPU) from the SIP SUBSCRIBE message, and to match the obtained IMPU to an IMPU that is stored in the memory in association with the one or more links. The memory may therefore be further configured to store an IMPU in association with each link between the access gateway node and the at least one CS PBX. The processor may also be configured to obtain a contact address from the SIP SUBSCRIBE message, and to match the obtained contact address to a stored contact address that is associated with the one or more links.

The receiver may be further configured to receive a SIP REGISTER message associated with the one or more links, and the processor is further configured to acquire a contact address associated with the one or more links from the SIP REGISTER message, and to store the acquired contact address of the one or more links in the memory.

The processor may be configured to generate a SIP NOTIFY message and to include the timeslot configuration information for the identified one or more links in a body of the SIP NOTIFY message, and the transmitter may be configured to send the SIP NOTIFY message to the access gateway node.

According to a third embodiment there is provided a method of configuring one or more links between a circuit-switched Private Branch Exchange (CS PBX) and an access gateway node that connects at least one CS PBX to an IP Multimedia Subsystem (IMS). The method is performed at the access gateway node. The access gateway node sends, to the IMS, a request for timeslot configuration information for the one or more links, and receives a response including the timeslot configuration information of the one or more links. The access gateway node then configures the one or more links in accordance with the received time timeslot configuration information.

The step of sending a request for timeslot configuration information for the one or more links may comprise generating a SIP SUBSCRIBE message that includes a token within an Event header field, the token indicating that the subscription relates to a request for link timeslot configuration information, and sending the SIP SUBSCRIBE message to the IMS. The method may then further comprise including an IMS Public User Identity (IMPU) that is associated with the one or more links in the SIP SUBSCRIBE message. The method may also comprise including a contact address that is associated with the one or more links in the SIP SUBSCRIBE message.

The method may further comprise, prior to sending the SIP SUSCRIBE message, generating a SIP REGISTER message associated with the one or more links, and including the contact address associated with the one or more links in the SIP REGISTER message, and sending the SIP REGISTER message to the IMS.

The step of receiving a response including the timeslot configuration information of the one or more links may comprise receiving a SIP NOTIFY message, a body of the SIP NOTIFY message including the timeslot configuration information for the one or more links.

According to a fourth embodiment there is provided an access gateway node that connects at least one circuit-switched Private Branch Exchange (CS PBX) to an IP Multimedia Subsystem (IMS) and that is configured to configure one or more links between a CS PBX and the access gateway node. The access gateway node comprises a processor, a transmitter, and a receiver. The processor is configured to generate a request for timeslot configuration information for the one or more link. The transmitter is configured to send the request to the IMS. The receiver is configured to receive a response including the timeslot configuration information of the one or more link. The processor is further configured to configure the one or more link in accordance with the received time timeslot configuration information.

The processor may be configured to generate a SIP SUBSCRIBE message that includes a token within an Event header field, the token indicating that the subscription relates to a request for link timeslot configuration information, and the transmitter may be configured to send the SIP SUBSCRIBE message to the IMS. The processor may then be further configured to include an IMS Public User Identity (IMPU) that is associated with the one or more link in the SIP SUBSCRIBE message. The processor may also be further configured to include a contact address that is associated with the one or more link in the SIP SUBSCRIBE message.

The processor may be further configured to generate a SIP REGISTER message associated with the one or more link, and to include the contact address associated with the one or more link in the SIP REGISTER message, and the transmitter may be further configured to send the SIP REGISTER message to the IMS.

The receiver may be configured to receive a SIP NOTIFY message, a body of the SIP NOTIFY message including the timeslot configuration information for the one or more link. The processor may then be further configured to retrieve the timeslot configuration information for the one or more link from the body of the SIP NOTIFY message.

BRIEF DESCRIPTION OF THE DRAWINGS

Some embodiments of the present disclosure will now be described in detail with reference to the accompanying drawings, in which.

DETAILED DESCRIPTION

In order to overcome the problems identified above, there will now be described methods and apparatus for configuring a link between a circuit-switched Private Branch Exchange (CS PBX) and an access gateway node that connects the CS PBX to an IP Multimedia Subsystem (IMS). According to the methods described herein, the IMS is enhanced to include an Application Server (AS) that is configured to provide link configuration information to an access gateway node that connects the CS PBX to the IMS. This AS is referred to herein as a Business Trunking Application Server (BTAS).

Figure 3:
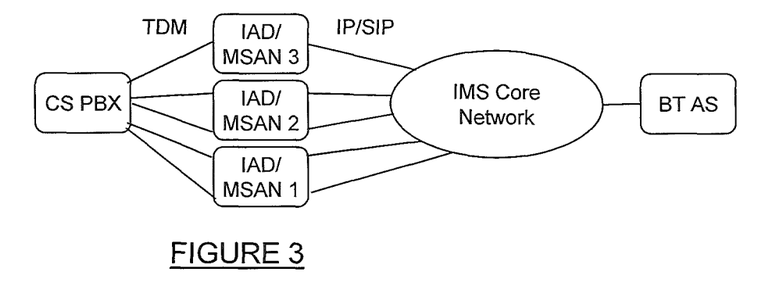
FIG. 3 illustrates schematically a CS PBX having multiple connections/links to an IMS core network via multiple gateway nodes, in which the IMS includes a Business Trunking AS (BTAS)

To implement this method, the BTAS is provisioned/pre-configured with link timeslot configuration information relating to each of the connections/links between an access gateway node and a CS PBX, wherein the timeslot configuration of each link between an access gateway node and a CS PBX can vary. The access gateway node is therefore configured to send a request for timeslot configuration information to the IMS, and the IMS is configured to route this request to the BTAS. Upon receiving the request, the BTAS is then configured to identify the link (i.e. between the access gateway node and a CS PBX) to which the request relates, and to respond to the request with the link configuration information for the identified link. The access gateway node can then use the link timeslot configuration information received in the response from the BTAS to configure the timeslots of the link. FIG. 3 illustrates schematically a CS PBX having multiple connections/links to an IMS core network via multiple IADs/MSANs, in which the IMS includes a BTAS to provide link timeslot configuration information. Whilst not illustrated in FIG. 3, it is also possible that a single CS PBX be connected to a single IAD/MSAN by multiple TDM links, and that multiple CS PBXs can be connected to a single IAD/MSAN.

In order to enable this method to be implemented using standard SIP signalling procedures, the access gateway node is configured to implement a separate IP connection/link (e.g. each having a different IP address and/or port number) between the access gateway node and the IMS for each TDM link between the access gateway node and a CS PBX, such that each IP connection will therefore correspond to a TDM link between the access gateway node and a CS PBX. The CS PBX then also has subscription with the IMS in which each link between the CS PBX and an access gateway node has its own, individual IMS Public User Identity (IMPU), each of which may or may not share the same IMS Private User Identity (IMPI). It is therefore possible for the access gateway node to register an individual link between the access gateway node and a CS PBX with the IMS, which further allows for SIP transactions to take place that relate to an individual link between the access gateway node and a CS PBX.

Figure 4:
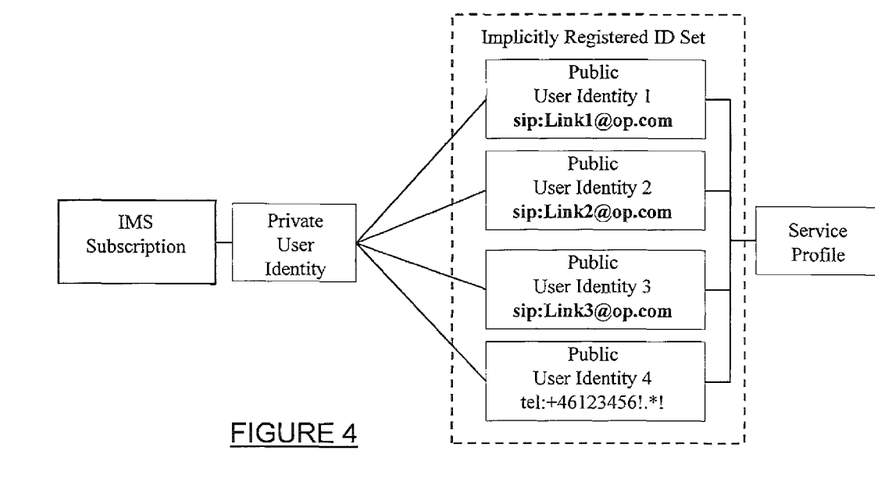
FIG. 4 illustrates an example of the data stored in a Home Subscriber Server (HSS) for the IMS subscription of a gateway node.

FIG. 4 illustrates an example of the data stored in a Home Subscriber Server (HSS) for the IMS subscription of such a CS PBX. In this example, the CS PBX has three separate IP links/connections to the IMS, each of which corresponds to a separate TDM link between the CS PBX and an access gateway node, and therefore has three separate IMPUs that each correspond to one of the IP links/connections to the IMS. The end users of the CS PBX are then represented by one or more wildcard IMPUs.

Figure 5:
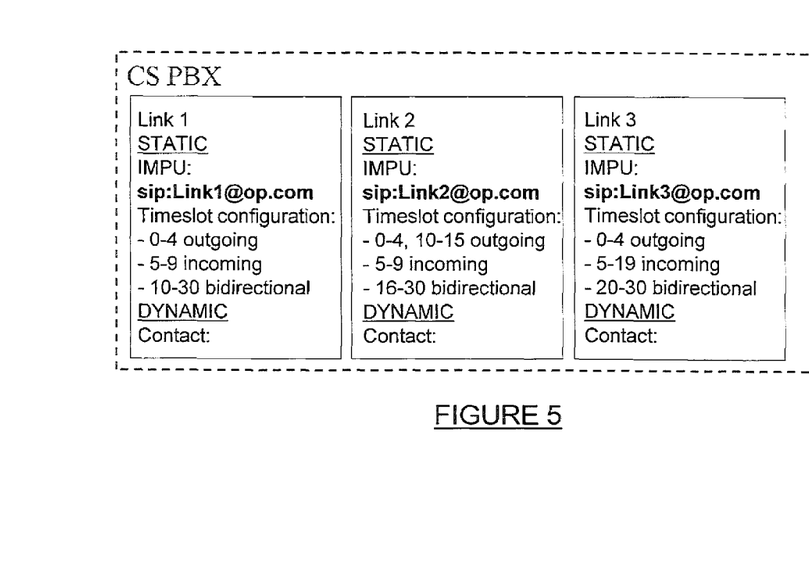
FIG. 5 illustrates an example of the data stored in the BTAS for a CS PBX.

When the access gateway node registers a link with the IMS, by implementing a registration of the associated IMPU, the IMS is configured to trigger a third party registration to the BTAS. To do so, the HSS is configured with a subscriber profile of the CS PBX, identified using the IMPU, that includes iFC that cause the third party registration to the BTAS. As a result of this third party registration, the BTAS can learn the contact address (i.e. IP address and port number or URL) of the link, and can store this contact address in association with the link timeslot configuration information. In this regard, the BTAS is provided with information relating to a CS PBX. The information may be pre-configured into the BTAS, or it may be stored in HSS transparent data and sent to the BTAS either during registration of the PBX or following a request from the BTAS. This CS PBX information includes link information relating to each separate link between the CS PBX and an access gateway node. The link information relating to each separate link includes the IMPU associated with the link, the timeslot configuration information of the link, and the dynamic addressing information of the link that is learnt during the registration of the IMPU associated with the link. FIG. 5 illustrates an example of the data stored in the BTAS for a CS PBX.

Figure 6:
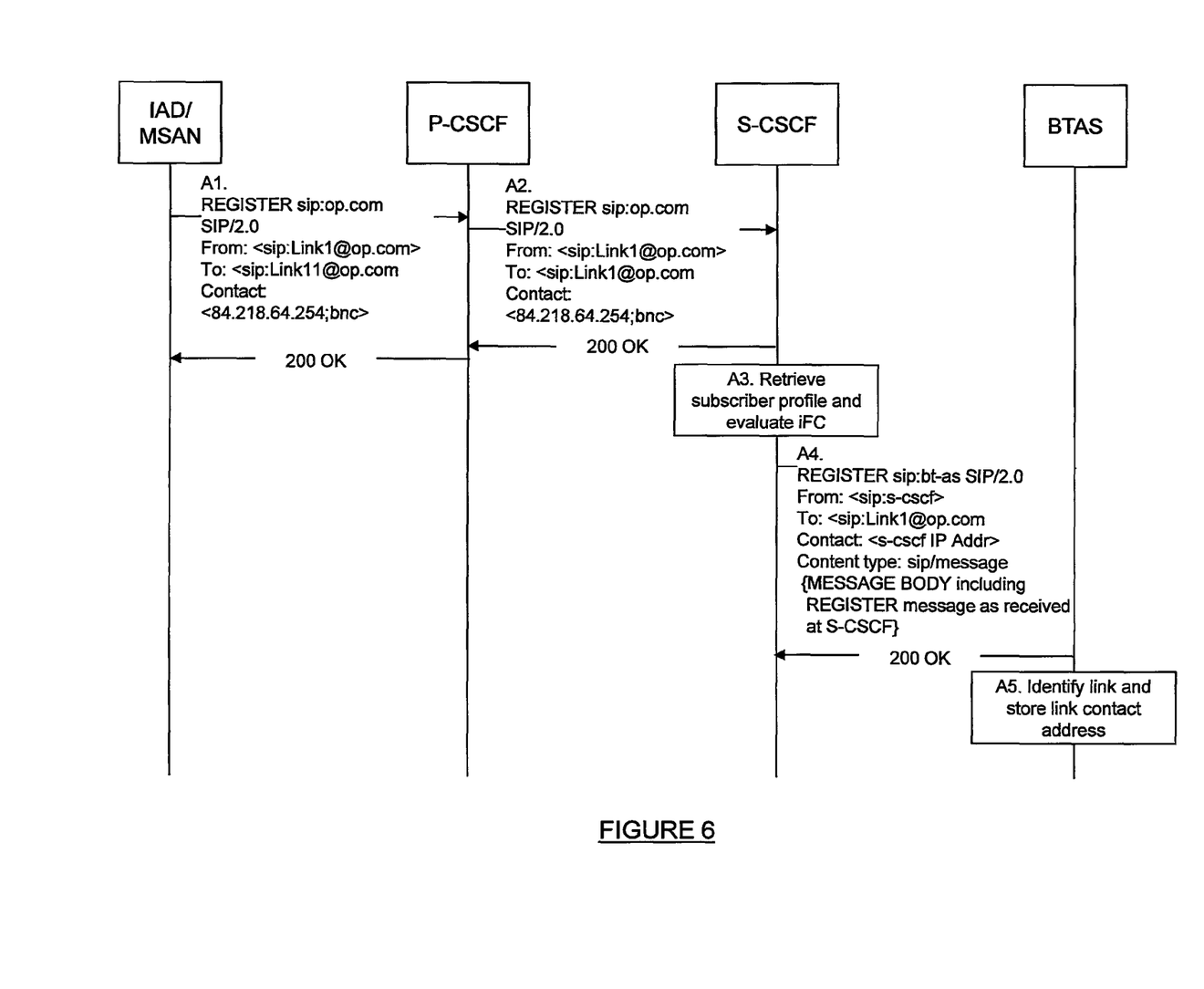
FIG. 6 is an example signalling flow diagram illustrating the process of an IMS registration of an individual link between a gateway node and a CS PBX.

FIG. 6 illustrates an example signalling flow diagram illustrating the process of an IMS registration of an IMPU that is related to an individual link between an IAD/MSAN and a CS PBX, wherein the IAD/MSAN interconnects the CS PBX to the IMS. The steps performed are as follows:

A1. The IAD/MSAN generates and sends a SIP REGISTER message to the IMS Core Network in order to effectively register a link with the IMS. The IAD/MSAN therefore includes the IMPU associated with link in the To header field. The IAD/MSAN also includes the contact address (i.e. IP address or URL) of the link in the Contact header field.

A2. The SIP REGISTER message is received by a P-CSCF of the IMS and is routed on to an S-CSCF via an I-CSCF.

A3. The S-CSCF uses the IMPU that is included in the To header field to retrieve the associated subscriber profile from the HSS, and evaluates the iFC included in the subscriber profile. The subscriber profile associated with the IMPU is configured to include iFC that cause a third party registration to the BTAS. The S-CSCF thereby determines that a third-party registration should be performed with a BTAS.

A4. Consequently, the S-CSCF sends a third-party SIP REGISTER message to the BTAS to inform the BTAS of the registration of the IMPU associated with the link. The original SIP REGISTER message (i.e. sent by IAS/MSAN) is included in the body of the third-party SIP REGISTER message.

A5. The BTAS receives the third-party SIP REGISTER message from the S-CSCF and processes the third-party SIP REGISTER message. The BTAS therefore identifies the link to which the registration relates using the IMPU included in the To header field of the SIP REGISTER message that is included in the body (i.e. the SIP REGISTER message received by the S-CSCF), and also learns the contact details of the link from the Contact header field of the SIP REGISTER message that is included in the body. The BTAS can therefore update the link information of the identified link to include the contact address of the IAD/MSAN that is associated with the link.

After registration of a link by an access gateway node, the access gateway node can obtain the timeslot configuration information for the link from the BTAS. To do so, the access gateway node can use the SIP SUBSCRIBE-NOTIFY procedures, whilst making use of a token that will identify the subscription as relating to the timeslot configuration information.

Figure 7:
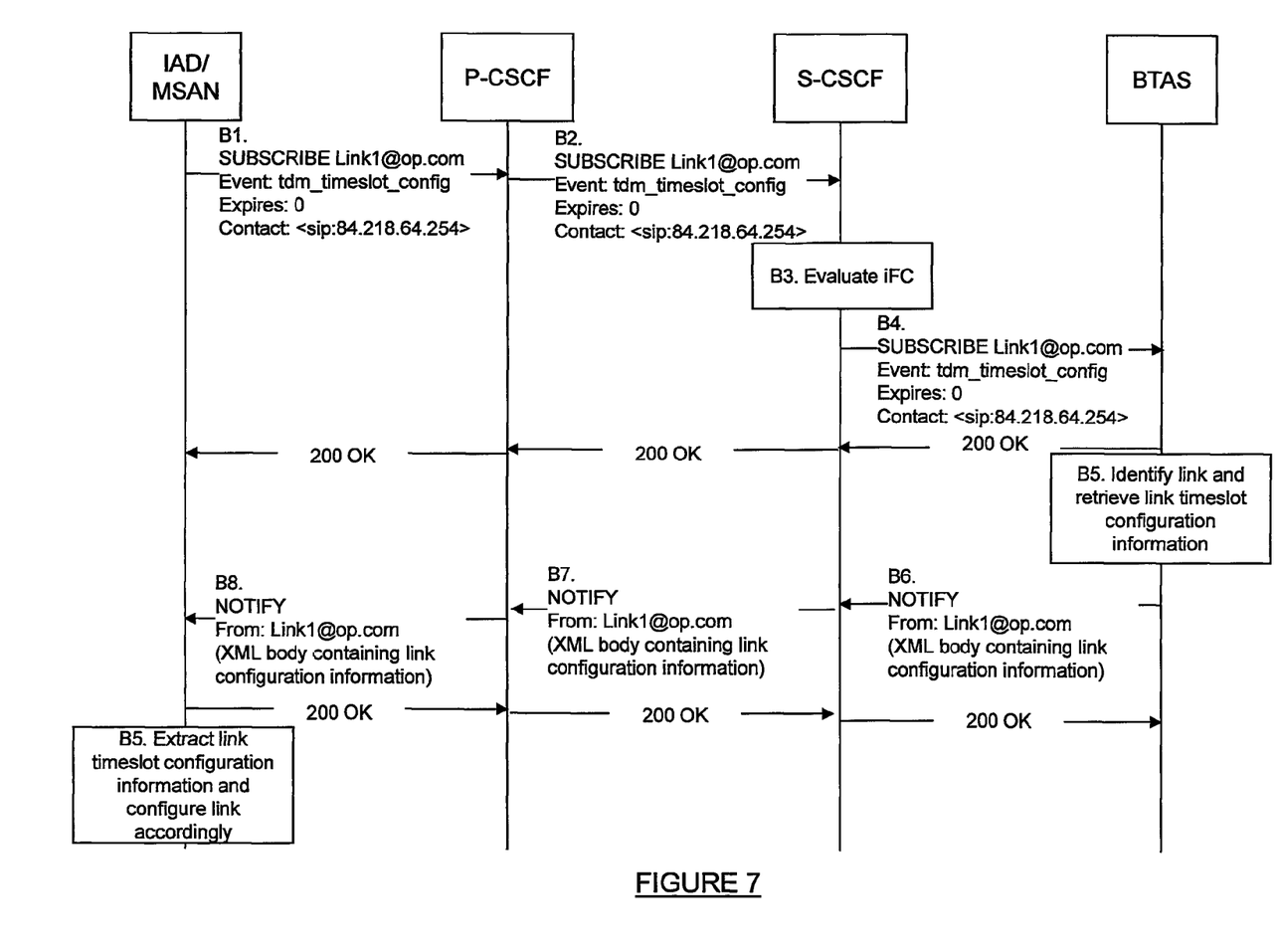
FIG. 7 illustrates an example signalling flow diagram illustrating the process of a gateway node obtaining timeslot configuration information for a link between the gateway node and a CS PBX.

FIG. 7 illustrates an example signalling flow diagram illustrating the process of an IAD/MSAN obtaining timeslot configuration information for a link between the IAD/MSAN and a CS PBX. The steps performed are as follows:

B1. After the successful registration of a link by the IAD/MSAN, the IAD/MSAN generates and sends a SIP SUBSCRIBE message to the IMS Core Network in order to pull the link configuration information from the BTAS. The IAD/MSAN includes the registered IMPU associated with the link in the Request URI of the SUBSCRIBE message, and the contact address (i.e. IP address or URL) of the link in the Contact header field. The IAD/MSAN also includes a token in the Event header of the SUBSCRIBE message that indicates that the subscription relates to link timeslot configuration information (e.g. tdm_timeslot_config, as illustrated in FIG. 7). In addition, given that the only needs to immediately fetch the link configuration information from the BTAS without a persistent subscription, the IAD/MSAN also sets the value of the Expires header of the SUBSCRIBE message to zero. By setting the Expires header to zero, the IAD/MSAN request an immediate fetch from the BTAS without a persistent subscription.

B2. The SIP SUBSCRIBE message is received by the P-CSCF of the IMS and is then routed on to the S-CSCF.

B3. The S-CSCF receives the SIP SUBSCRIBE message and uses the IMPU in the Request URI to identify the associated subscriber profile (i.e. retrieved at registration of the IMPU). The S-CSCF therefore evaluates the iFC included in the subscriber profile and thereby determines that the SIP SUBSCRIBE message should be sent to the BTAS. For example, the iFC could be configured to specify that a SIP SUBSCRIBE message whose Event header includes the "tdm_timeslot_config" token should trigger forwarding of the SIP SUBSCRIBE message to the BTAS.

B4. The S-CSCF therefore sends the SIP SUBSCRIBE message to the BTAS.

B5. The BTAS receives the SIP SUBSCRIBE message from the S-CSCF and processes the SIP SUBSCRIBE message. The BTAS determines that the SIP SUBSCRIBE message is a request for timeslot configuration information from the token included in the Event header. The BTAS therefore identifies the link to which the subscription relates, and retrieves the timeslot configuration information of the identified link from the link information that has been pre-configured at the BTAS. For example, the BTAS can identify the link using the IMPU included in the Request URI, or the contact address included in the Contact header field, the contact address of the link having been stored by the BTAS during registration of the link by the IAD/MSAN.

B6. The BTAS generates and sends a SIP NOTIFY message to the IAD/MSAN, and includes the timeslot configuration of the identified link within the body of the NOTIFY message. For example, the link timeslot configuration information could be included in the body of the NOTIFY message using Extensible Markup Language (XML).

B7. The SIP NOTIFY message is received by the S-CSCF and is then routed on to the P-CSCF.

B8. The SIP NOTIFY message is received by the P-CSCF and is then routed on to the IAD/MSAN.

B9. The IAD/MSAN receives the SIP NOTIFY message from the P-CSCF and processes the SIP NOTIFY message to extract the link timeslot configuration information from the body of the message. The IAD/MSAN then configures the TDM link to the CS PBX in accordance with the received link timeslot configuration information.

Following the configuration of a TDM link between an access gateway node and a CS PBX, the CS PBX will be able to select a timeslot on that link to be used for an outgoing call from those timeslots that have been allocated as outgoing and/or bidirectional timeslots. Similarly, the access gateway node will be able to select a timeslot on that link to be used for an incoming call from those timeslots that have been allocated as incoming and/or bidirectional timeslots. In addition, both the CS PBX and the IAD/MSAN will be able to perform collision control and prevent collisions between incoming and outgoing calls (i.e. prevent calls from using the same timeslot from the bidirectional timeslot pool) in accordance with ITU-T recommendation Q.931. Furthermore, if for any reason the access gateway node subsequently again requires the link timeslot configuration information, then the access gateway node can repeat the SIP SUBSCRIBE-NOTIFY procedures described above.

The IAD/MSAN may periodically re-register the links with the IMS, and may be configured to request the timeslot information using a new SUBSCRIBE message after each registration.

The IAD/MSAN may include multiple links in a single registration. In this way, the group of links in the registration would be associated with a single IMPU and a single contact IP address. In this case, the BTAS would store configuration information for all of the links and associate this information with a single IMPU, and would respond to the SUBSCRIBE message specifying that IMPU with the configuration information for all links.

If the access gateway node expects that a TDM link between the access gateway node and a CS PBX has timeslot configuration information provisioned in the BTAS, and therefore requests this timeslot configuration information from the BTAS, but there is no timeslot configuration provisioned, then the BTAS can be configured to respond to the request with default timeslot configuration information. For example, the default timeslot configuration information could specify that all time slots are bi-directional. In addition, the BTAS could also be configured to alert the operator of the access gateway node/CS PBX that the access gateway node has requested timeslot configuration information that does not exist at the BTAS. For example, the BTAS could generate and send an alert message to the O&M systems of the operator.

Figure 8:
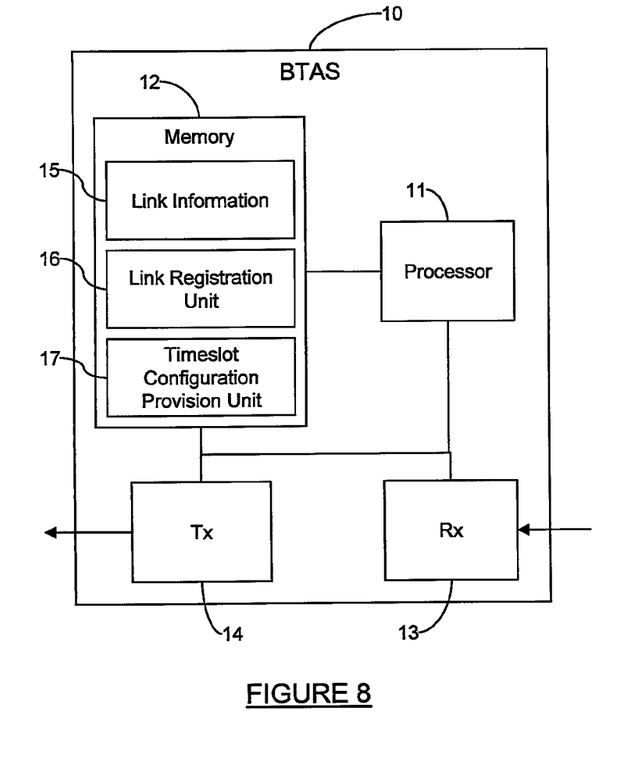
FIG. 8 illustrates schematically an example of a BTAS suitable for implementing the methods described herein.

FIG. 8 illustrates schematically an example of a BTAS 10 configured to provide link configuration information in accordance with the methods described above. The BTAS 10 can be implemented as a combination of computer hardware and software and comprises a processor 11, a memory 12, a receiver 13, and a transmitter 14. The memory 12 stores the various programs/executable files that are implemented by the processor 11, and also provides storage for any required data. For example, the memory 12 would be configured to store the link information 15 that relates to each separate link between a gateway node and a CS PBX. As described above, the information 15 of each link includes at least the IMPU associated with the link, and the timeslot configuration information of the link. The programs/executable files stored in the memory 12, and implemented by the processor 11, can include a link registration unit 16 configured to process a received third-party SIP REGISTER message that relates to link between a gateway node and a CS PBX, and a timeslot configuration unit 17 configured to identify the link to which a request for link configuration information relates, to retrieve the timeslot configuration information for the identified link, and to generate a response including the timeslot configuration of the identified link.

Figure 9:
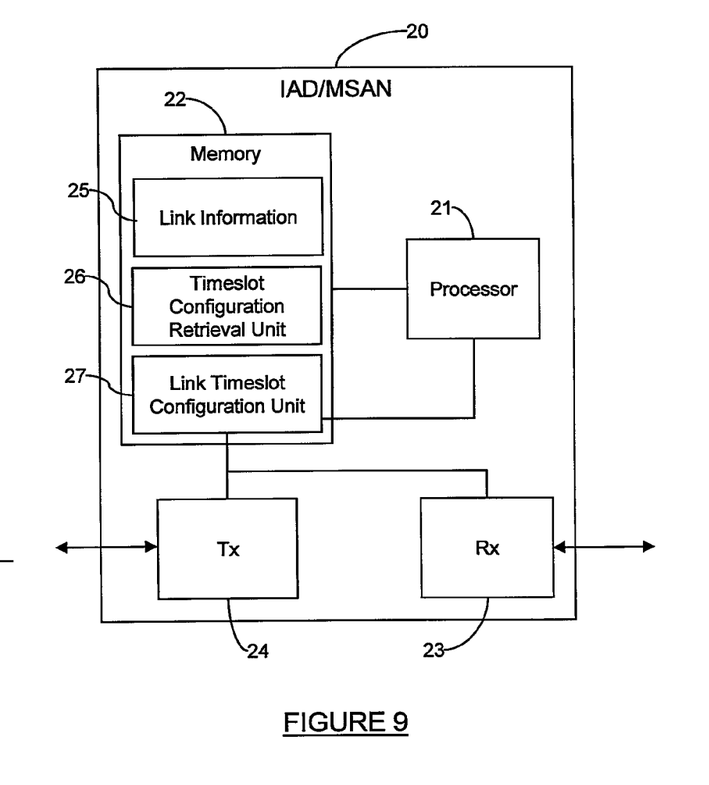
FIG. 9 illustrates schematically an example of a gateway node suitable for implementing the methods described herein.

FIG. 9 illustrates schematically an example of an access gateway node 20 configured to enable connect a CS PBX to the IMS in accordance with the methods described above. For example, the access gateway node 20 could be either IAD or an MSAN, as described above. The access gateway node 20 can be implemented as a combination of computer hardware and software and comprises a processor 21, a memory 22, a receiver 23, and a transmitter 24. The memory 22 stores the various programs/executable files that are implemented by the processor 21, and also provides storage for any required data. For example, the memory 22 could be configured to store the link timeslot configuration information 25 of a link between the access gateway node and a CS PBX, once this information has been received from a BTAS. The programs/executable files stored in the memory 22, and implemented by the processor 21, can include a timeslot configuration retrieval unit 26 configured to obtain the timeslot configuration information for a link from a BTAS, and a link timeslot configuration unit 27 configured to configure a link between the access gateway node 20 and a CS PBX in accordance with link timeslot configuration information obtained from a BTAS.

The methods and apparatus described above enable timeslot configuration for the TDM links between an access gateway node and a CS PBX to be performed without the need for manual O&M configuration of each gateway node, by providing that this information need only be provisioned at a single node of the IMS (i.e. a BTAS). In doing so, the methods and apparatus described above provide a more efficient means for implementing this timeslot configuration that reduces the operating costs of the access gateway nodes, without the need for a specially defined provisioning interface.

Although the present disclosure has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the embodiments, whether alone or in any appropriate combination with any other feature disclosed or illustrated herein. For example, in the illustrated example signalling flow diagrams described above, only those messages and headers that are of particular relevance are shown. Those skilled in the art will be aware those messages and headers that have not been included in this illustration.

The invention claimed is:

1. A method of enabling configuration of one or more links between a circuit-switched Private Branch Exchange, CS PBX, and an access gateway node that connects at least one CS PBX to an IP Multimedia Subsystem, IMS, the method comprising:
   at an IMS Application Server, AS:
       for each link between the access gateway node and the at least one CS PBX, configuring the AS with timeslot configuration information for the link;
       receiving, from the access gateway node, a request for timeslot configuration information for one or more links between the gateway node and a CS PBX;

identifying the one or more links to which the request relates;

retrieving the timeslot configuration information for the identified one or more links; and sending, to the access gateway node, a response including the timeslot configuration of the identified one or more links.

2. A method according to claim 1, wherein the step of receiving a request for timeslot configuration information comprises:

receiving a SIP SUBSCRIBE message that includes a token within an Event header field, the token indicating that the subscription relates to a request for link timeslot configuration information;

and the step of identifying the one or more links to which the request relates optionally comprises:

obtaining a contact address or an IMS Public User Identity, IMPU, from the SIP SUBSCRIBE message, and matching the obtained contact address or IMPU to a stored contact address or IMPU that is associated with the one or more links.

3. A method according to claim 2, and further comprising:

prior to receiving the SIP SUSCRIBE message, receiving a SIP REGISTER message associated with the one or more links, and acquiring a contact address associated with the one or more links from the SIP REGISTER message, and storing the learned contact address of the one or more links.

4. A method according to claim 1, wherein the step of sending a response to the access gateway node comprises:

generating a SIP NOTIFY message and including the timeslot configuration information for the identified one or more links in a body of the SIP NOTIFY message; and sending the SIP NOTIFY message to the access gateway node.

5. An IP Multimedia Subsystem, IMS, Application Server, AS, configured to enable configuration of one or more links between a circuit-switched Private Branch Exchange, CS PBX, and an access gateway node that connects at least one CS PBX to an IP Multimedia Subsystem, IMS, the AS comprising:

a memory configured to store timeslot configuration information for each link between the access gateway node and the at least one CS PBX;

a receiver configured to receive, from the access gateway node, a request for timeslot configuration information for one or more links between the access gateway node and a CS PBX;

a processor configured to identify the one or more links to which the request relates, to retrieve the timeslot configuration information for the identified one or more links, and to generate a response including the timeslot configuration of the identified one or more links; and a transmitter configured to send the response to the access gateway node.

6. An MS Application Server according to claim 5, wherein:

the receiver is configured to receive a SIP SUBSCRIBE message that includes a token within an Event header field, the token indicating that the subscription relates to a request for link timeslot configuration information; and the processor is optionally configured to obtain a contact address and/or an IMS Public User Identity, IMPU, from the SIP SUBSCRIBE message, and to match the obtained contact address or IMPU to a contact address or IMPU that is stored in the memory in association with the one or more links.

7. An IMS Application Server according to claim 5, wherein the receiver is further configured to receive a SIP REGISTER message associated with the one or more links, and the processor is further configured to acquire a contact address associated with the one or more links from the SIP REGISTER message, and to store the acquired contact address of the one or more links in the memory.

8. An IMS Application Server according to claim 5, wherein the processor is configured to generate a SIP NOTIFY message and to include the timeslot configuration information for the identified one or more links in a body of the SIP NOTIFY message, and the transmitter is configured to send the SIP NOTIFY message to the access gateway node.

9. A method of configuring one or more links between a circuit-switched Private Branch Exchange, CS PBX, and an access gateway node that connects at least one CS PBX to an IP Multimedia Subsystem, IMS, the method comprising:

at the access gateway node:

sending, to the IMS, a request for timeslot configuration information for the one or more links;

receiving a response including the timeslot configuration information of the one or more links; and configuring the one or more links in accordance with the received time timeslot configuration information.

10. A method according to claim 9, wherein the step of sending a request for timeslot configuration information for the one or more links comprises:

generating a SIP SUBSCRIBE message that includes a token within an Event header field, the token indicating that the subscription relates to a request for link timeslot configuration information; and sending the SIP SUBSCRIBE message to the IMS;

wherein the SIP SUBSCRIBE message optionally includes a contact address and/or an IMS Public User Identity, IMPU, that is associated with the one or more links.

11. A method according to claim 10, and further comprising:

prior to sending the SIP SUSCRIBE message, generating a SIP REGISTER message associated with the one or more links, and including the contact address associated with the link in the SIP REGISTER message; and sending the SIP REGISTER message to the IMS.

12. A method according to claim 9, wherein the step of receiving a response including the timeslot configuration information of the one or more links comprises:

receiving a SIP NOTIFY message, a body of the SIP NOTIFY message including the timeslot configuration information for the one or more link.

13. An access gateway node configured to configure one or more links between a circuit-switched Private Branch Exchange, CS PBX, and the access gateway node that connects at least one CS PBX to an IP Multimedia Subsystem, IMS, the access gateway node comprising;

a processor configured to generate a request for timeslot configuration information for the one or more links;

a transmitter configured to send the request to the IMS;

a receiver configured to receive a response including the timeslot configuration information of the one or more links; and the processor being further configured to configure the link in accordance with the received time timeslot configuration information.

14. An access gateway node according to claim 13, wherein the processor is configured to generate a SIP SUBSCRIBE message that includes a token within an Event header field, the token indicating that the subscription relates to a request for link timeslot configuration information, and the transmitter is configured to send the SIP SUBSCRIBE message to the IMS, and wherein the processor is optionally further configured to include a contact address or an IMS Public User Identity, IMPU, that is associated with the one or more links in the SIP SUBSCRIBE message.

15. An access gateway node according to claim 13, wherein the processor is further configured to generate a SIP REGISTER message associated with the one or more links, and to include the contact address associated with the one or more links in the SIP REGISTER message, and the transmitter is further configured to send the SIP REGISTER message to the IMS.

16. An access gateway node according to claim 13, wherein the receiver is configured to receive a SIP NOTIFY message, a body of the SIP NOTIFY message including the timeslot configuration information for the one or more links, and processor is further configured to retrieve the timeslot configuration information for the link from the body of the SIP NOTIFY message.

* * * * *